US007051928B2

(12) United States Patent
Kallin

(10) Patent No.: US 7,051,928 B2
(45) Date of Patent: May 30, 2006

(54) DOCUMENT DIVERTER APPARATUS FOR USE IN A SELF-SERVICE TERMINAL

(75) Inventor: Fredrik L.N. Kallin, Waterloo (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/941,518

(22) Filed: Sep. 15, 2004

(65) Prior Publication Data

US 2006/0054690 A1 Mar. 16, 2006

(51) Int. Cl.
*G07F 19/00* (2006.01)

(52) U.S. Cl. ...................................................... 235/379

(58) Field of Classification Search ................ 235/379; 221/218; 705/43

See application file for complete search history.

(56) References Cited

U.S. PATENT DOCUMENTS 4,381,447 A 4/1983 Horvath et al.
5,136,144 A * 8/1992 Swinton et al. ............. 235/379
5,852,977 A * 12/1998 Lynch ........................ 101/232
5,897,625 A * 4/1999 Gustin et al. ................. 705/43
6,170,818 B1 * 1/2001 Eastman et al. ............ 271/184

FOREIGN PATENT DOCUMENTS

EP 1 139 303 A2 10/2001
GB 2 213 472 A 8/1989
WO WO 03/077209 A2 9/2003

* cited by examiner

*Primary Examiner*—Thien M. Le
*Assistant Examiner*—Kristy A. Haupt
(74) *Attorney, Agent, or Firm*—Michael Chan

(57) ABSTRACT

A document diverter apparatus is provided for use in a self-service terminal at which a self-service user can deposit a document to conduct a self-service transaction. The document diverter apparatus comprises first and second roller members. The document diverter apparatus further comprises a movable diverter roller member disposed between the first and second roller members and movable between the first and second roller members such that the diverter roller member and the first roller member co-operate to define at least a portion of a first document transport path of the self-service terminal when the diverter roller member and the first roller member are moved to a first position and the diverter member and the second roller member co-operate to define at least a portion of a second document transport path of the self-service terminal when the diverter roller member and the second roller member are in a second position which is different from the first position. The document diverter apparatus further comprises an endless belt drivingly interconnecting the diverter roller member and the first and second roller members. The document diverter apparatus further comprises an energizeable solenoid for, when energized, moves parts from one position to the other position. The other position corresponds to the first position and the solenoid being energized, and the one position corresponds to the second position and the solenoid being de-energized.

12 Claims, 9 Drawing Sheets

DOCUMENT DIVERTER APPARATUS FOR USE IN A SELF-SERVICE TERMINAL

BACKGROUND OF THE INVENTION

The present invention relates to a self-service terminal, and is particularly directed to a document diverter apparatus for use in a self-service terminal, such as a cheque cashing ATM.

A cheque cashing ATM allows a registered user, who typically does not have a bank account, to cash a cheque and receive money from the ATM in a public access, unattended environment. A user typically registers with an institution that owns or operates cheque cashing ATMs, and provides identification information (such as a social security number) and information about a cheque (usually a pay cheque) that he/she regularly receives. The registered user is typically provided with a card to initiate a cheque cashing transaction at a cheque cashing ATM. The cheque information typically includes details of how frequently a cheque is paid (for example, every week), who the cheque is paid by (that is, the payor of the cheque), the payor's bank details (for example, a bank code identifying the name of the bank), the typical amount that the cheque is made out for, and such like.

To cash a cheque, a user enters his/her card at a cheque cashing ATM, then enters a cheque to be cashed through a cheque slot in the ATM's fascia. A cheque transport mechanism receives the entered cheque and transports the cheque in a forward direction along a cheque transport path to a number of locations within the ATM to process this cheque. If the cheque is valid, and the details printed on the cheque match the cheque information provided during registration, then the ATM informs the user of a surcharge that will be applied if the user wishes to cash the cheque. If the user does not agree to the surcharge, then the cheque transport mechanism operates to transport the cheque in the reverse direction along the same cheque transport path to return the cheque to the user via the cheque slot. If the user agrees to the surcharge, then cash is dispensed to the user and the cheque transport mechanism operates to transport the cheque along a different cheque transport path to a storage bin within the ATM.

A diverter mechanism is usually used to divert a cheque from one cheque transport path to the other cheque transport path. The typical diverter mechanism includes a number of curved blades which are shifted from one position to another position to divert the cheque from the one cheque transport path to the other cheque transport path. A drawback in using known diverter mechanisms is that they are often associated with relatively higher levels of document jams. This occurs because a folded or crumpled document (i.e., a folded or crumpled cheque in this case) has a tendency to jam when it is deflected around a corner or tight curve such as in the area of a diverter mechanism. The resistance of the folded or crumpled cheque causes the cheque to crumple. Once the cheque starts to crumple, it tends to bunch up and jam.

When a cheque jam occurs, the ATM may be out of service for hours until a service call is made. Since a service engineer is normally not on site in a self-service environment, the cost of servicing the call is relatively expensive. It would be desirable to provide a diverter mechanism for use in a self-service environment such that the risk of document jams, especially as documents are being transported in the area of the diverter mechanism, is reduced.

SUMMARY OF THE INVENTION

In accordance with one aspect of the invention, a self-service terminal is provided for use in an unattended environment to allow a self-service user to conduct a self-service transaction. The self-service terminal comprises a fascia including means defining a document slot, means defining a document storage bin, and a document processing module. The document processing module includes means defining a document processing zone, means defining a first document transport path which extends between the document slot and the document processing zone, means defining a second document transport path which is different from the first document transport path and which extends between the document processing zone and the document storage bin. The document processing module further includes a document diverter for (i) enabling a document to be transported along the first document transport path between the document slot and the document processing zone when parts of the document diverter mechanism are in a first position, and (ii) enabling a document to be transported along the second document transport path from the document processing zone to the document storage bin when parts of the document diverter mechanism are in a second position which is different from the first position. The document diverter mechanism includes first and second rollers and a movable diverter roller disposed between the first and second rollers such that (i) the diverter roller and the first roller co-operate to define at least a portion of the first document transport path extending between the document slot and the document processing zone when parts are in the first position, and (ii) the diverter roller and the second roller co-operate to define at least a portion of second document transport path extending between the document processing zone and the document storage bin when parts are in the second position. The document diverter mechanism includes an endless belt drivingly interconnecting the diverter roller and the first and second rollers. The document diverter mechanism further includes an energizeable solenoid for, when energized, moves parts from one position to the other position. The document diverter mechanism further includes resilient means for returning parts from the other position back to the one position when the solenoid is energized, and moves from the other position to the one position when the solenoid is de-energized. The other position corresponds to the first position and the solenoid being energized, and the one position corresponds to the second position and the solenoid being de-energized.

In accordance with another aspect of the invention, a cheque cashing automated teller machine (ATM) is provided for enabling an ATM customer to conduct a cheque deposit transaction. The cheque cashing ATM comprises an ATM fascia including (i) means defining a currency dispensing slot through which currency can be dispensed to an ATM customer, and (ii) means defining a cheque entrance/exit slot. The cheque cashing ATM further comprises a currency dispensing module for dispensing currency via the currency dispensing slot to an ATM customer, a cheque storage bin for storing cheques deposited by ATM customers, and a cheque processing module for receiving a cheque from an ATM customer. The cheque processing module includes means defining a cheque processing zone, means defining a bi-directional cheque transport path which extends between the cheque entrance/exit slot and the cheque processing zone, means defining a divert cheque transport path which is different from the bi-directional cheque transport path and which extends between the cheque processing zone and the cheque storage bin, and a cheque path diverter mechanism. The cheque path diverter mechanism is provided for (i) enabling a cheque to be transported along the bi-directional cheque transport path between the cheque entrance/exit slot and the cheque processing zone when parts of the cheque path diverter mechanism are in a first position, and (ii) enabling a cheque to be transported along the divert cheque transport path from the cheque processing zone to the cheque storage bin when parts of the cheque path diverter mechanism are in a second position which is different from the first position. The cheque path diverter mechanism includes first and second roller members and a movable diverter roller member disposed between the first and second roller members such that (i) the diverter roller member and the first roller member co-operate to define at least a portion of the bi-directional cheque transport path extending between the cheque entrance/exit slot and the cheque processing zone when parts are in the first position, and (ii) the diverter roller member and the second roller member co-operate to define at least a portion of the divert cheque transport path extending between the cheque processing zone and the cheque storage bin when parts are in the second position. The cheque cashing ATM further comprises a controller for controlling the currency dispensing module to dispense currency via the currency dispensing slot to an ATM customer when a cheque which has been deposited by the ATM customer is transported along the divert cheque transport path from the cheque processing zone to the cheque storage bin. The cheque path diverter mechanism includes an endless belt drivingly interconnecting the diverter roller member and the first and second roller members. The cheque path diverter mechanism includes an energizeable solenoid for, when energized, moves parts from one position to the other position. The cheque path diverter mechanism includes resilient means for returning parts from the other position to the one position when the solenoid is de-energized. The other position corresponds to the first position and the solenoid being energized, and the one position corresponds to the second position and the solenoid being de-energized. The cheque processing module includes a magnetic ink character recognition (MICR) reader disposed along the bi-directional cheque transport path.

In accordance with yet another aspect of the invention, a document diverter apparatus is provided for use in a self-service terminal at which a self-service user can deposit a document to conduct a self-service transaction. The document diverter apparatus comprises first and second roller members, and a movable diverter roller member disposed between the first and second roller members and movable between the first and second roller members such that the diverter roller member and the first roller member co-operate to define at least a portion of a first document transport path of the self-service terminal when the diverter roller member and the first roller member are moved to a first position and the diverter member and the second roller member co-operate to define at least a portion of a second document transport path of the self-service terminal when the diverter roller member and the second roller member are in a second position which is different from the first position. The document diverter apparatus further comprises an endless belt drivingly interconnecting the diverter roller member and the first and second roller members. The document diverter apparatus further comprises an energizeable solenoid for, when energized, moves parts from one position to the other position. The other position corresponds to the first position and the solenoid being energized, and the one position corresponds to the second position and the solenoid being de-energized.

BRIEF DESCRIPTION OF THE DRAWINGS

These and other aspects of the present invention will be apparent from the following specific description, given by way of example, with reference to the accompanying drawings, in which.

DETAILS OF THE INVENTION

Figure 1:
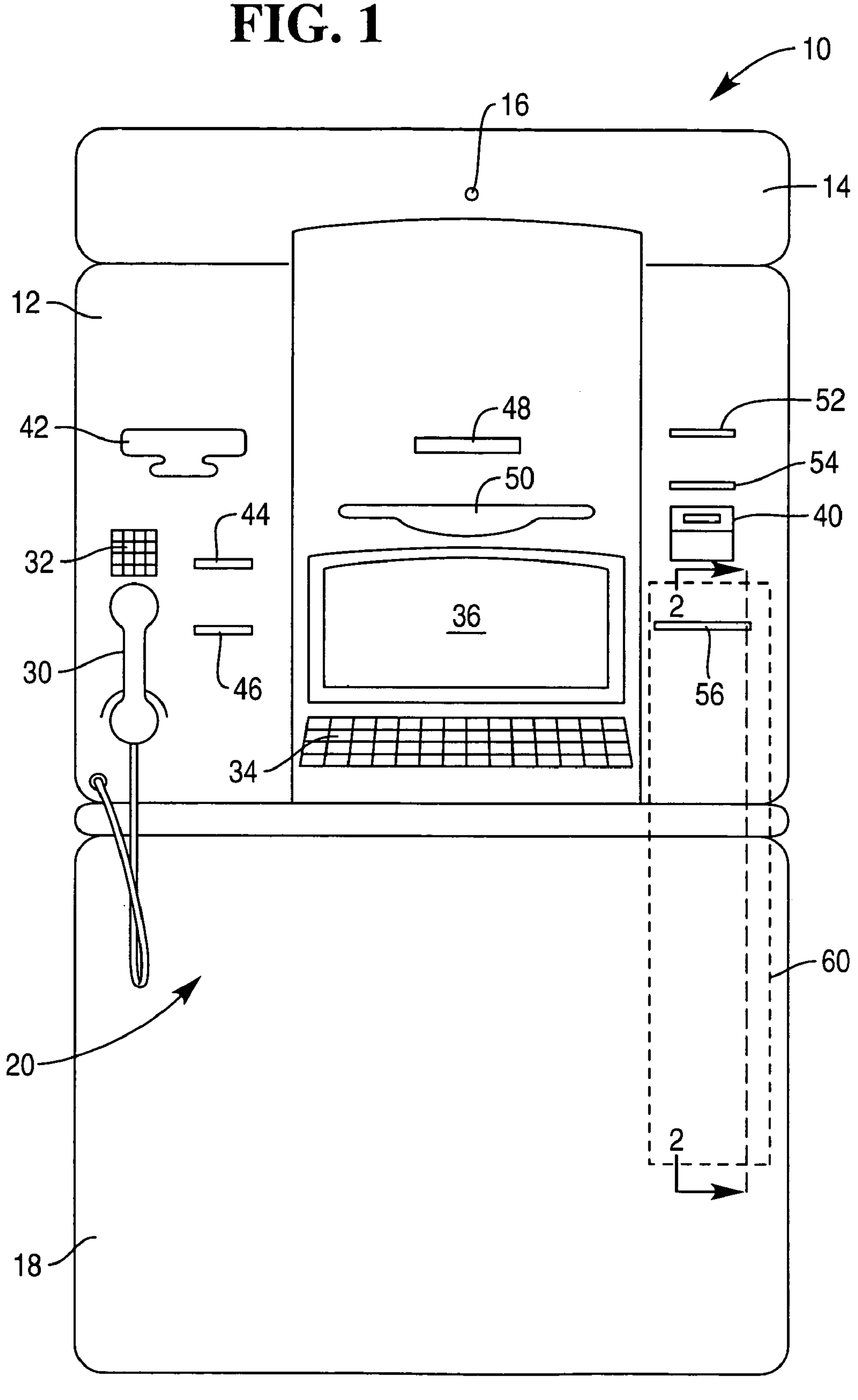
FIG. 1 is a pictorial diagram of a cheque cashing ATM embodying the present invention.

Reference is made to FIG. 1, which illustrates a self-service terminal 10 in the form of a cheque cashing ATM. The ATM 10 comprises a fascia 12 pivotably coupled to a chassis (not shown); an upper panel 14 mounted to the chassis and defining an aperture 16 through which a camera (not shown) images a user of the ATM 10; and a lower panel 18 hingeably coupled to the chassis so that the lower panel 18 can be opened to reveal a safe (not shown) mounted in the chassis. When the lower panel 18 is open, the fascia 12 can be pivoted upwards to reveal ATM modules mounted within the chassis.

The fascia 12 and lower panel 18 provide a user interface 20 for allowing a user to execute a transaction. The fascia 12 includes a handset 30 and a telephone keypad 32 for allowing a user to contact a remote operator (not shown) typically located in a call centre (not shown). The fascia 12 also includes an encrypting keyboard 34 for allowing a user to enter transaction details, and a display 36 for presenting screens to a user. The fascia 12 also defines slots for receiving and dispensing media items, and a tray 40 into which coins can be dispensed. The slots include: a money order printer slot 42, a bunch note input slot 44, a bunch note exit slot 46, a statement output slot 48, a cash dispense slot 50, a card reader slot 52, a card issue slot 54, and a cheque input/output slot 56. The slots 42 to 56 and tray 40 are arranged so that when the fascia 12 is closed, the slots and tray align with corresponding ATM modules mounted within the ATM's chassis (not shown). The user interface features described above are all provided on an NCR PERSONAS (trade mark) P86 ATM, available from NCR Financial Solutions Group Limited, Discovery Centre, 3 Fulton Road, Dundee, DD2 4SW, Scotland.

Figure 2:
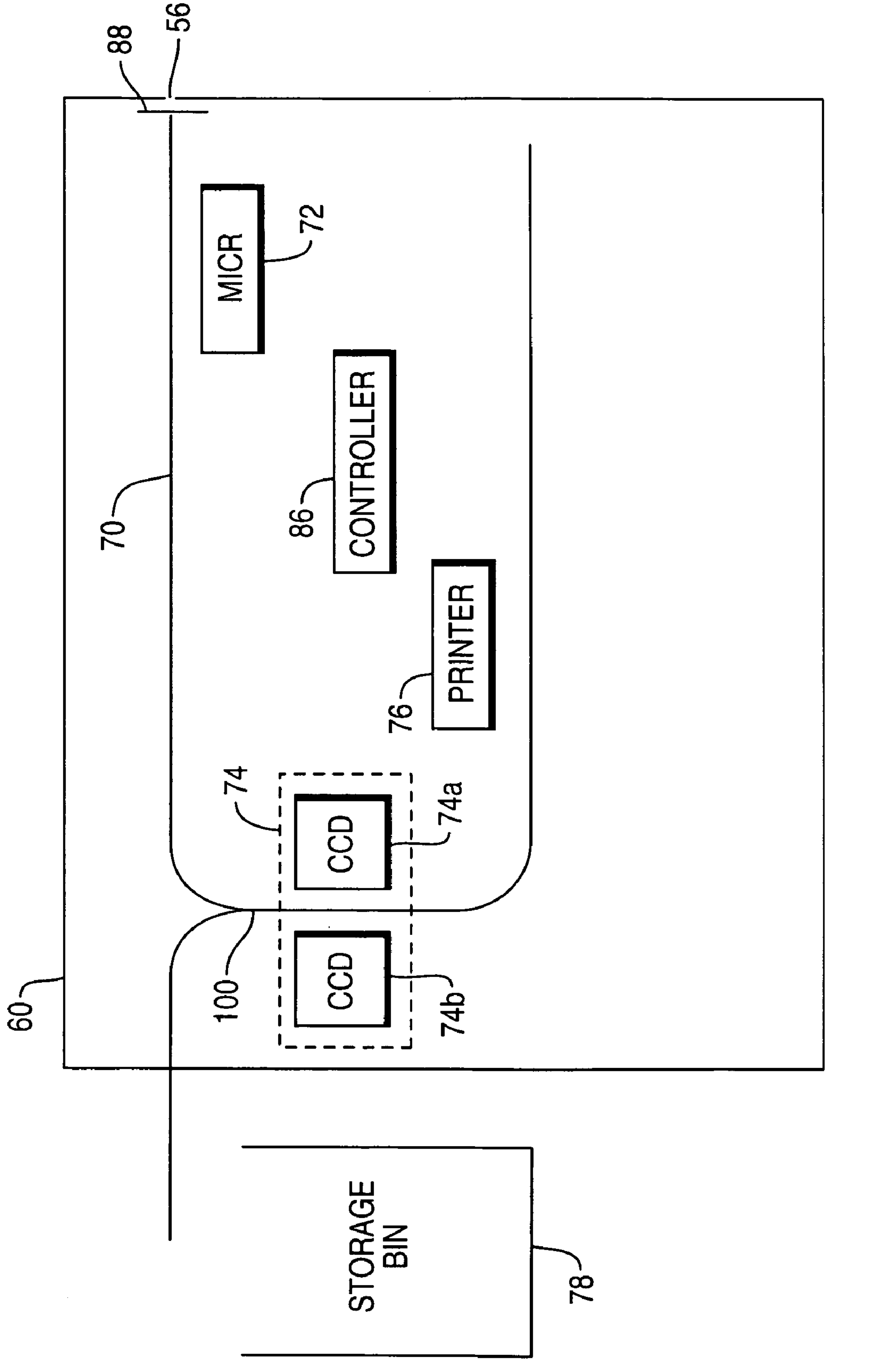
FIG. 2 is a simplified schematic sectional diagram, taken approximately along line 2—2 in FIG. 1, and showing a part (the cheque processing module) of the ATM of FIG. 1.
Figure 3:
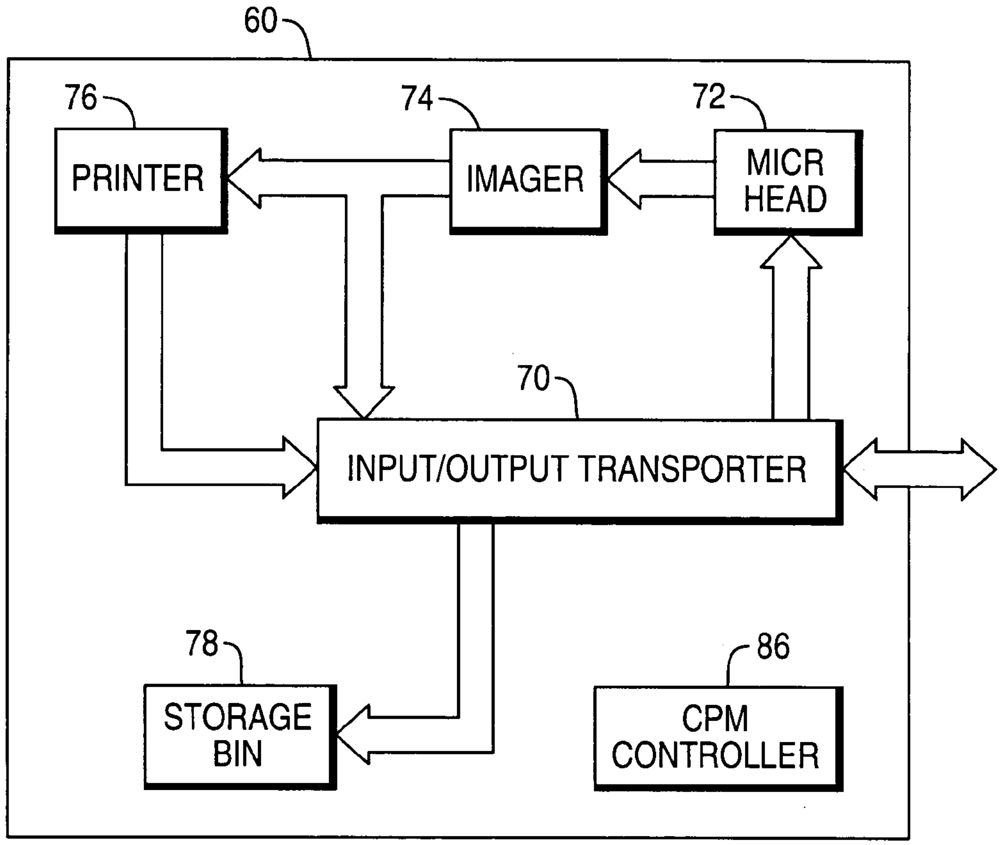
FIG. 3 is a block diagram of the cheque processing module of FIG. 2.

A cheque processing module (CPM) 60 will now be described with reference to FIG. 2 and FIG. 3. FIG. 2 is a simplified schematic sectional diagram (along line 2—2 in FIG. 1) showing part of the fascia 12 and lower panel 18, and the main parts of the CPM 60. FIG. 3 is a block diagram illustrating the main elements in the CPM 60. The CPM 60 is a modified version of a conventional cheque processing module, such as the cheque processing module provided with the PERSONAS (trade mark) P86 ATM.

The CPM 60 comprises the following elements: a cheque input/output transport mechanism 70 including an alignment mechanism for aligning a cheque; a MICR head 72 for reading magnetic details on a code line of a cheque; an imager 74 including an upper 74*a* and lower 74*b* CCD camera for capturing an image of each side of a cheque (front and rear); a printer 76 for endorsing a cheque; and a storage bin 78 for storing processed cheques. The elements are conventional and will not be described in detail herein. The CPM 60 also includes a controller 86 for controlling the operation of the elements within the CPM 60. The CPM 60 also includes an entrance shutter 88 for opening and closing the cheque input/output slot 56. The CPM 60 further includes a belt-driven type of document diverter apparatus 100 which provides a diverting function with active drive for a document (a cheque in this case) as the cheque is transported along either a first continuous document transport path or a second continuous document transport path which is different from the first continuous document transport path, as explained in detail hereinbelow.

Figure 4:
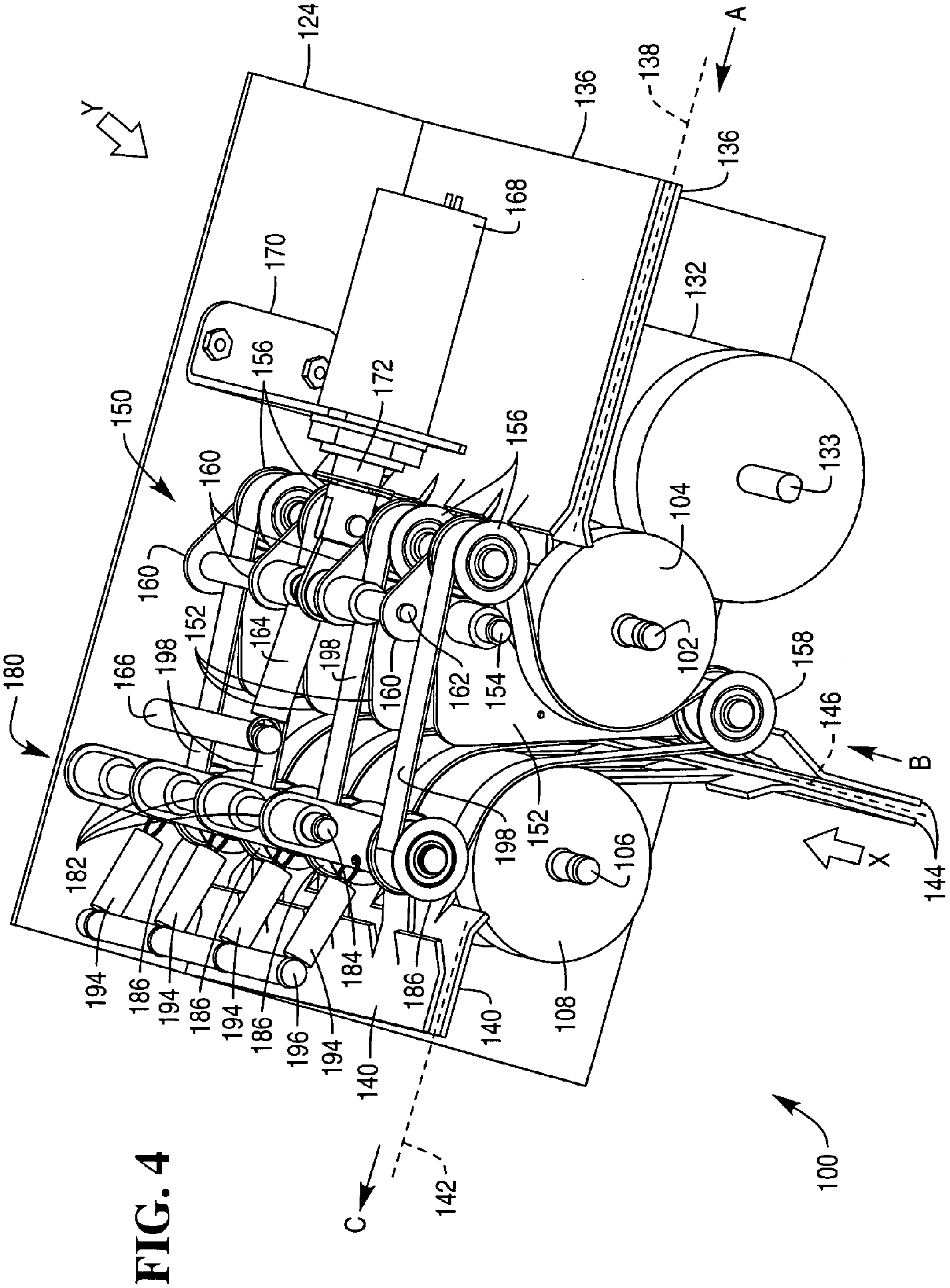
FIG. 4 is a pictorial view of a part (the document diverter apparatus) of the ATM of FIG. 1, and showing parts in a first position.
Figure 5:
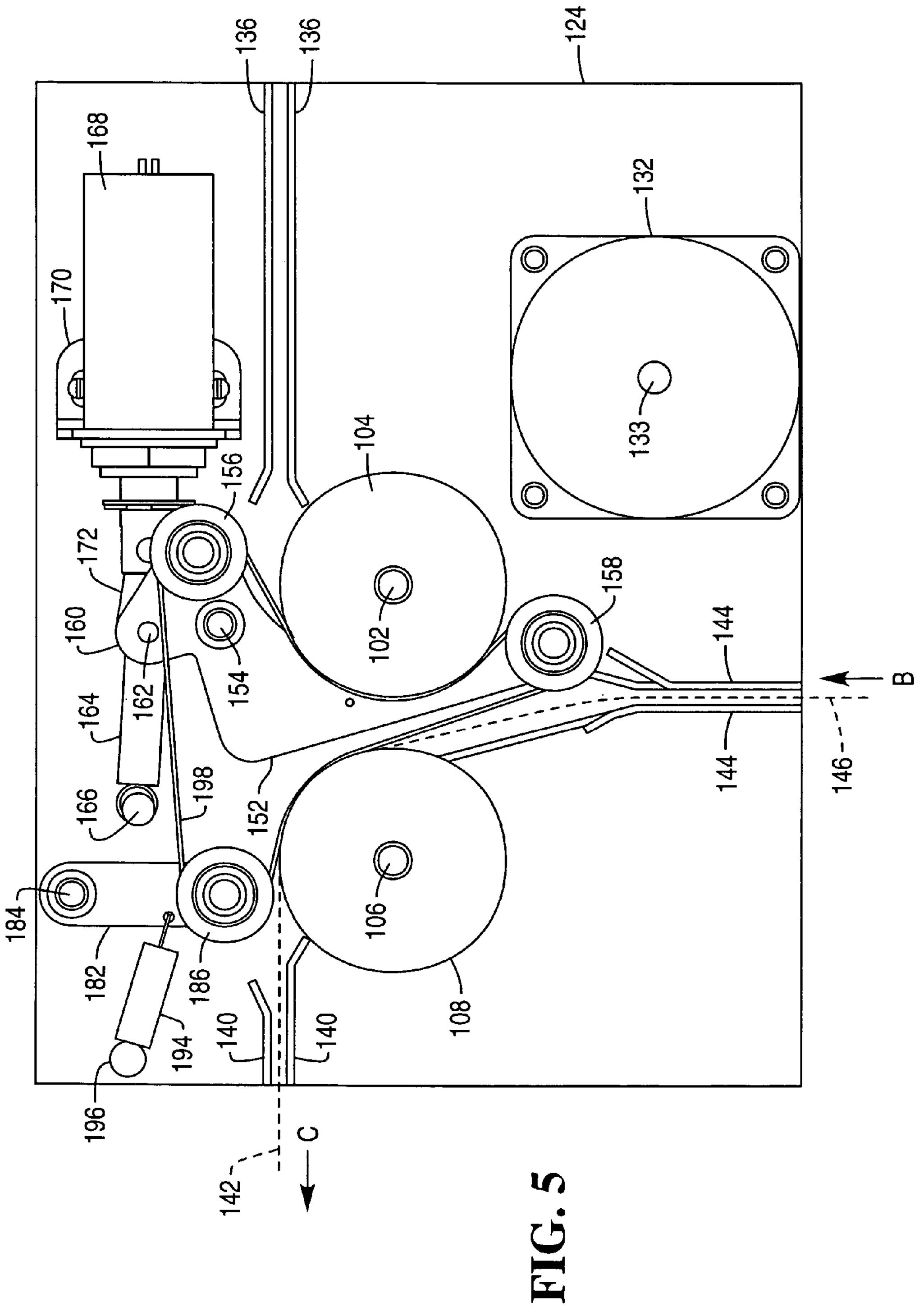
FIG. 5 is an end view of the document diverter apparatus of FIG. 4, looking in the direction of arrow X of FIG. 4, and showing parts in the first position.
Figure 6:
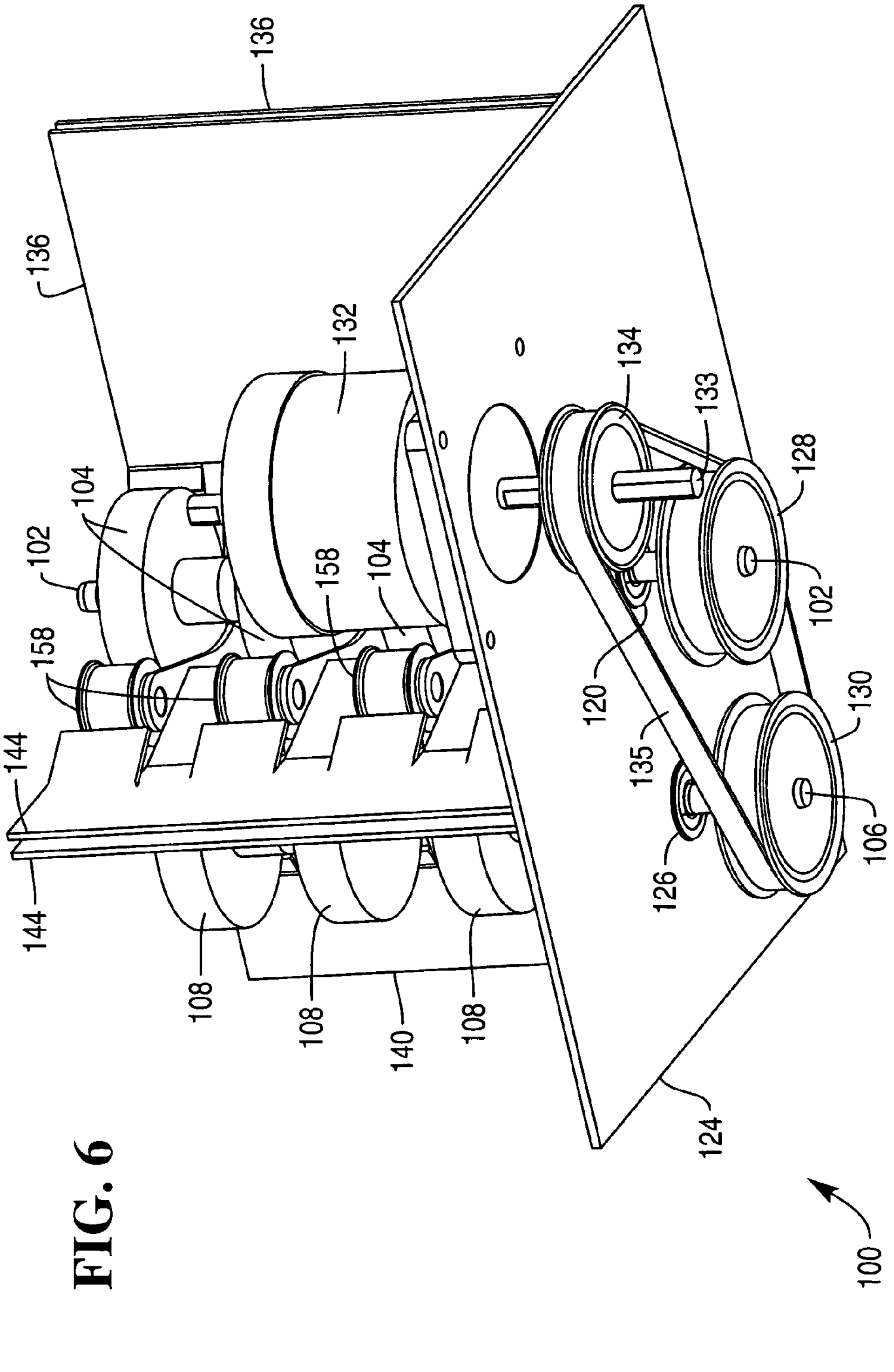
FIG. 6 is an another view of the document diverter apparatus of FIG. 4, looking in the direction of arrow Y of FIG. 4.

Referring to FIGS. 4, 5, and 6, the diverter apparatus 100 includes a first drive shaft 102 to which four rubber drive rollers 104 are fixedly mounted, and a second drive shaft 106 to which four rubber drive rollers 108 are fixedly mounted. As shown in FIG. 6, a first journal bearing 120 disposed on a frame part 124 of the CPM 60 supports the first drive shaft 102 for rotation about its longitudinal central axis. Similarly, a second journal bearing 126 supports the second drive shaft 106 for rotation about its longitudinal central axis. A first drive pulley 128 is connected to one end of the first drive shaft 102, and a second drive pulley 130 is connected to one end of the second drive shaft 106. A drive motor 132 mounted to the frame part 124 includes a motor shaft 133 to which a motor drive pulley 134 is attached. A flat endless belt 135 drivingly interconnects the motor drive pulley 132 and the first and second drive pulleys 128, 130, as shown in FIG. 6. Accordingly, each of the first and second drive shafts 102, 106 rotate in the same direction as the direction of rotation of the driven motor shaft 133.

As best shown in FIG. 4, the diverter apparatus 100 further includes a first set of plate-like members 136 which form a first path portion 138, a second set of plate-like members 140 which form a second path portion 142, and a third set of plate-like members 144 which form a third path portion 146. Each of the three sets of members 136, 140, 144 is connected to the frame part 124. Each member of the first set of members 136 has a lip which flares out towards the four drive rollers 104 to allow a document item to more easily enter from the rollers 104 into the first path portion 138. Similarly, each member of the second set of members 140 has a lip which flares out towards the four drive rollers 108 to allow a document item to more easily enter from the rollers 108 into the second path portion 142. Also, each member of the third set of members 144 has a lip which flares out towards an area in the vicinity between the four drive rollers 104 and the four drive rollers 108 to allow a document item to more easily enter from this area into the third path portion 146.

The diverter apparatus 100 includes a first arm assembly 150 which has four arm portions 152 which are coupled together through a pin shaft 162 and are rotatable about a first pivot shaft 154 which is fixedly connected to the frame part 124. The four arm portions 152 pivot about the first pivot shaft 154 together as a unit. Each of four idler rollers 156 is connected to one end of an associated one of the four arm portions 152, and each of four diverter rollers 158 (as best shown in FIG. 6) is connected to an opposite end of an associated one of the four arm portions 152. Each of four flange portions 160 extends away from an associated one of the four arm portions 152. Each of the four flange portions 160 has an associated hole through which the pin shaft 162 extends. An extension spring 164 interconnects the pin shaft 162 and a first spring support shaft 166 which is fixedly connected to the frame part 124. An energizeable solenoid 168 is fixedly connected via a bracket 170 to the frame part 124, and has an armature 172 which is attached to the pin shaft 162, as best shown in FIG. 4.

The diverter apparatus 100 further includes a second arm assembly 180 which has four arm portions 182 which are individually rotatable about a second pivot shaft 184 which is fixedly connected to the frame part 124. Each of four idler rollers 186 is connected to one end of an associated one of the four arm portions 182. Each extension spring of a set of extension springs 194 (four extension springs used in the exemplary embodiment) interconnects an associated one of the four arm portions 182 and a second spring support shaft 196 which is fixedly connected to the frame part 124. Each of four flat endless belts 198 drivingly interconnects an associated one of the four idler rollers 156 of the first arm assembly 150, an associated one of the four idler rollers 186 of the second arm assembly 180, and an associated one of the four diverter rollers 158 of the first arm assembly 150, as best shown in FIG. 4.

The parts of the diverter apparatus 100 are shown in FIGS. 4, 5, and 6 in a first position. When a cheque is transported from the slot 56 to the printer 76, the controller 86 commands the drive motor 132 to rotate its drive shaft 133 counter-clockwise (CCW) (as viewed looking at FIG. 5) and the solenoid 168 to energize. When the solenoid 168 energizes, parts move from the first position shown in FIGS. 4 and 5 to a second position shown in FIGS. 7 and 8. Since the drive shaft 133 of the drive motor 132 is rotating CCW (as viewed looking at FIG. 8), the four drive rollers 156 and the four drive rollers 186 are also rotating CCW.

Figure 7:
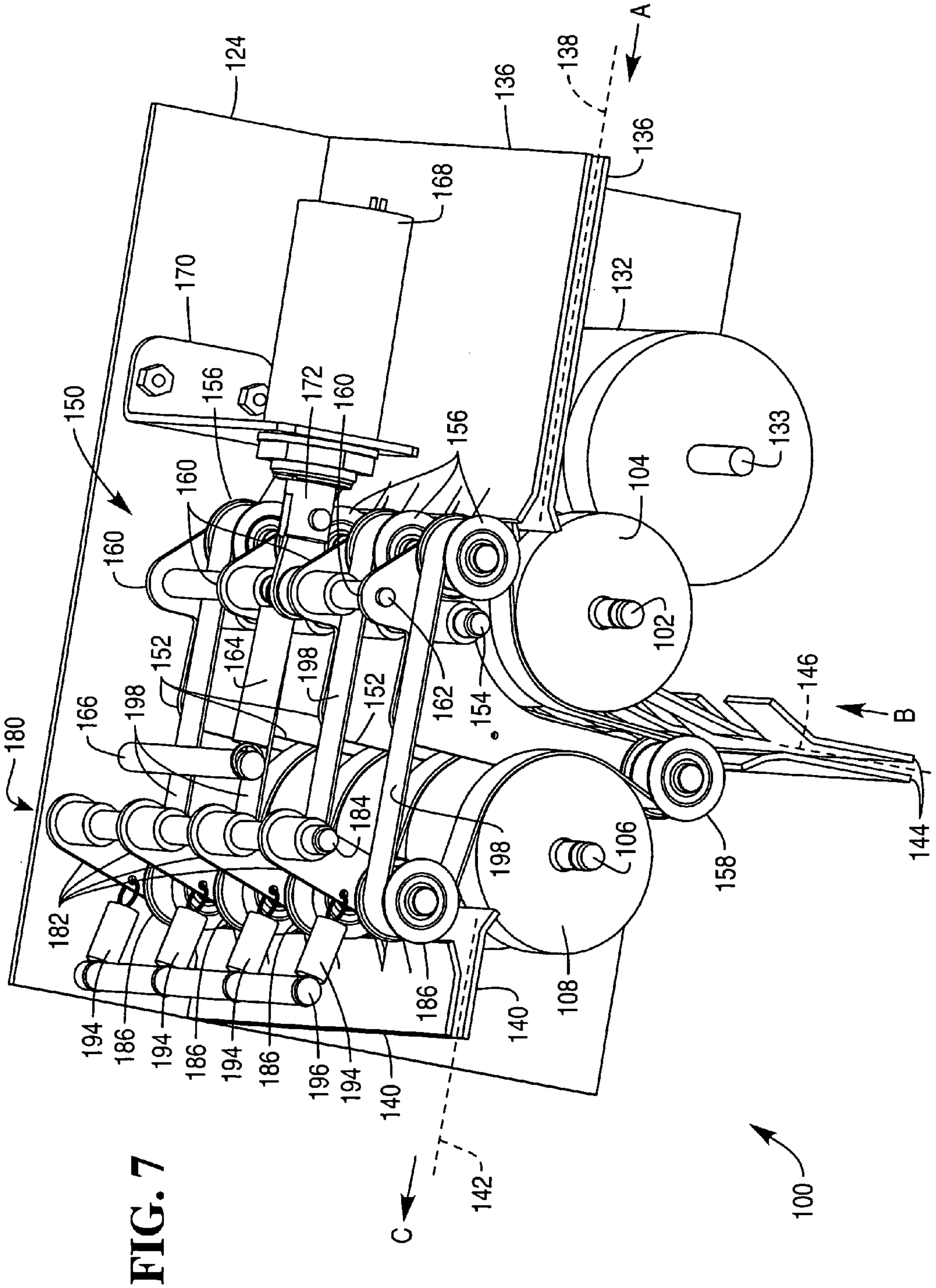
FIG. 7 is a view similar to FIG. 4 and showing parts in a second position.
Figure 8:
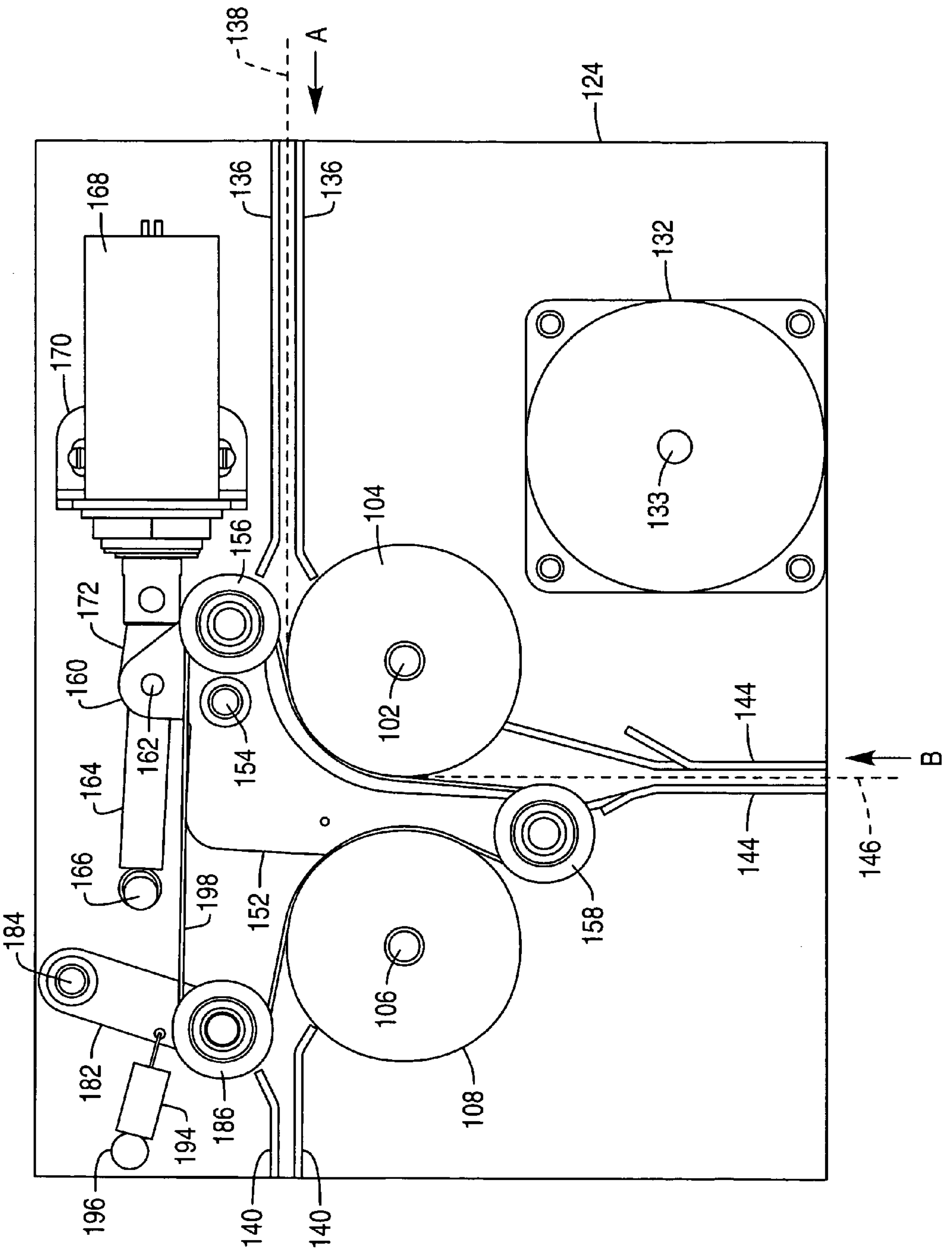
FIG. 8 is a view similar to FIG. 9 and showing parts in the second position.

As the cheque moves along the first path portion 138 in the direction of arrow A as shown in FIG. 7, the cheque eventually enters a series of four nips which are defined between the four drive rollers 104 and the four drive belts 198. As the cheque enters the nips, the driving pressure between the four drive rollers 104 and the four drive belts 198 frictionally engages the cheque to transport the cheque around a substantially 90-degrees angle from the first path portion 138 to the third path portion 146. Accordingly, when the drive shaft 133 of the drive motor 132 is driven in the CCW direction and parts are in the second position shown in FIGS. 7 and 8, a first continuous document transport path comprising the first path portion 138 and the third path portion 146 extends between the cheque entrance/exit slot 56 and the zone in the vicinity of the endorser printer 76 (FIG. 1). The cheque is transported along this first continuous document transport path from the slot 56 to the printer 76.

Similarly, when a cheque is transported from the printer 76 to the slot 56, the controller 86 commands the drive motor 132 to rotate its drive shaft 133 clockwise (CW) (as viewed looking at FIG. 8) and the solenoid 168 to energize. As previously described, when the solenoid 168 is energized, parts are in the second position shown in FIGS. 7 and 8. Since the drive shaft 133 of the drive motor 132 is rotating CW (as viewed looking at FIG. 8), the four drive rollers 104 and the four drive rollers 108 are also rotating CW.

As the cheque moves along the third path portion 146 in the direction of arrow B as shown in FIG. 7, the cheque eventually enters the nips between the four drive rollers 104 and the four drive belts 198. As the cheque enters the nips, the driving pressure between the four drive rollers 104 and the four drive belts 198 frictionally engages the cheque to transport the cheque around a substantially 90-degrees angle from the third path portion 146 to the first path portion 138. Thus, when the drive shaft 133 of the drive motor 132 is driven in the CW direction and parts are in the second position shown in FIGS. 7 and 8, the cheque is transported along the first continuous document transport path from the printer 76 to the slot 56.

When a cheque is in the zone of the printer 76 and the controller 86 (FIG. 1) makes a determination that the cheque needs to be transported into the storage bin 78, the controller 86 commands the drive motor 132 to rotate its drive shaft 133 CCW (as viewed looking at FIG. 8) and the solenoid 168 to de-energize. When the solenoid 168 de-energizes, parts are moved by co-operation of the biasing forces of the extension spring 164 and the set of springs 194 from the second position shown in FIGS. 7 and 8 back to the first position shown in FIGS. 4 and 5. Since the drive shaft 133 is rotating CCW (as viewed looking at FIG. 5), the four drive rollers 104 and the four drive rollers 108 are also rotating CCW.

As the cheque moves along the third path portion 146 in the direction of arrow B as shown in FIG. 4, the cheque eventually enters a series of four nips which are defined between the four drive rollers 108 and the four drive belts 198. As the cheque enters the nips, the driving pressure between the four drive rollers 108 and the four drive belts 198 frictionally engages the cheque to transport the cheque around a substantially 90-degrees angle from the third path portion 146 to the second path portion 142. Accordingly, when the drive shaft 133 of the drive motor 132 is driven in the CCW direction and parts are in the first position shown in FIGS. 4 and 5, a second continuous document transport path comprising the third path portion 146 and the second path portion 142 extends between the printer 76 and the storage bin 78. The cheque is transported along this second continuous document transport path from the printer 76 to the storage bin 78.

As the cheque is transported along the second path portion 142 in the direction of arrow C in FIG. 5, the cheque eventually leaves the end of the second path portion 142 (shown as arrow C in FIG. 5) and goes into the storage bin 78. Although the storage bin 78 is shown located outside of the CPM 60, it is contemplated that the storage bin may be located inside the CPM.

After the cheque has been diverted into the storage bin 78, the controller 86 commands the drive motor 132 to stop rotation of its drive shaft 133. The solenoid 168 remains de-energized. Accordingly, parts remain in the position as shown in FIGS. 4 and 5 until another cheque needs to be transported from the slot 56 to the printer 76. When parts are back in the first position as shown in FIGS. 4 and 5, the first continuous document transport path comprising the first path portion 138 and the third path portion 146 again extends between the slot 56 and the printer 76.

Figure 9:
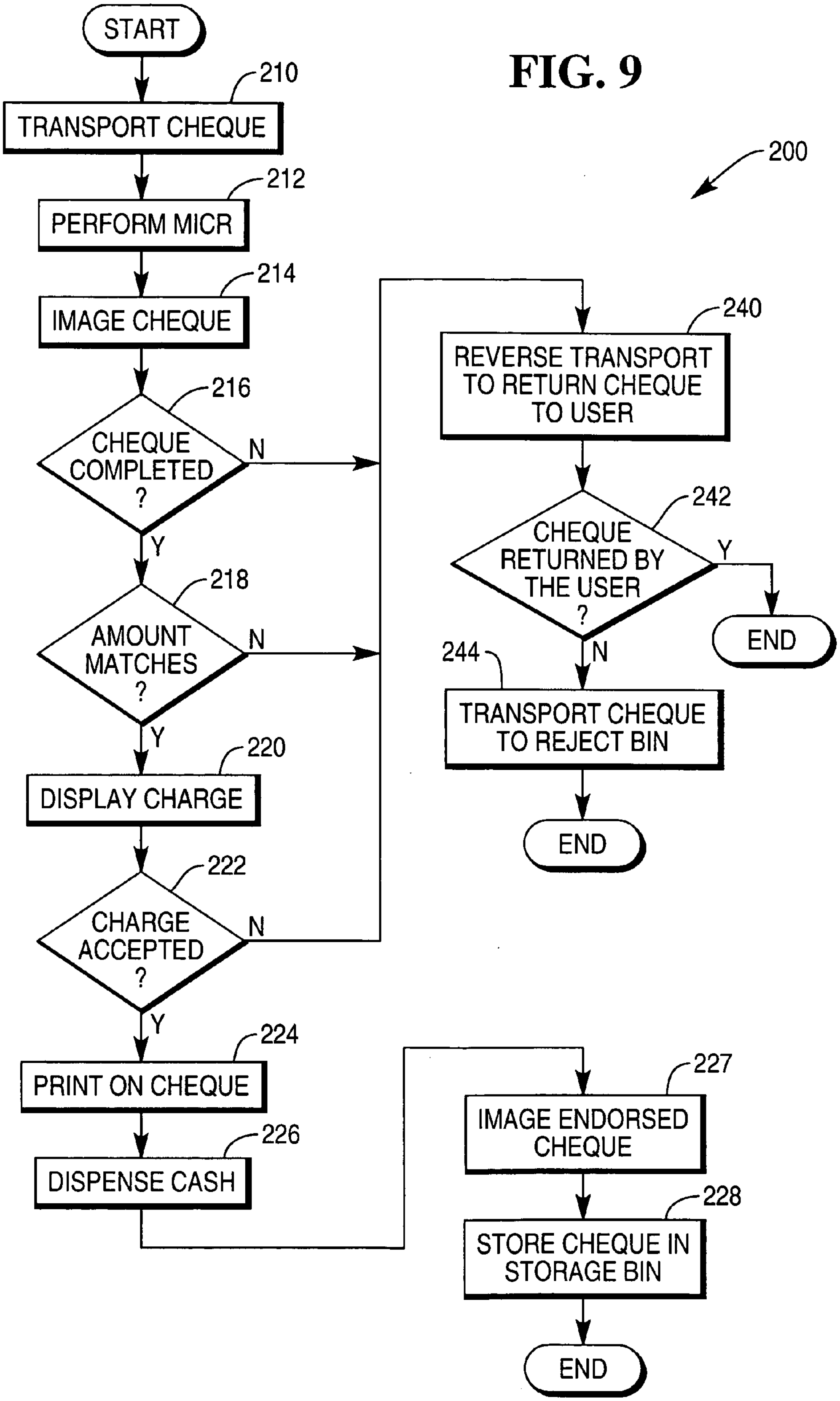
FIG. 9 is a flowchart illustrating the steps involved in a cheque cashing operation.

A typical transaction will now be described with reference to FIG. 9 which is a flowchart 200 illustrating the steps involved in a cheque cashing transaction, and also with reference to FIGS. 1 to 3. In this transaction, a user has registered with an institution owning and operating the ATM 10, and the user has informed the institution that he receives a weekly pay cheque for two hundred dollars, and has received a registration card for accessing cheque cashing functions at the ATM 10. Initially, the user enters the registration card into the card reader slot 52, selects "cheque cashing" from a list of transaction options presented on the display 36, and inserts the cheque to be cashed through the cheque input/output slot 56. The controller 86 opens the slot shutter 88 to receive the cheque, and the transport mechanism 70 transports the received cheque (step 210) to the MICR head 72 where a code line on the cheque is read (step 212). The transport mechanism 70 then transports the cheque through the diverter apparatus 100 (FIG. 2) to the imager 74, where both sides of the cheque are imaged (step 214).

The controller 86 then verifies that the cheque has been completed correctly (step 216). If the cheque is incomplete, then the controller 86 initiates a cheque return operation, described below. If the cheque is complete, then the controller 86 verifies that the amount printed in a courtesy amount field on the cheque matches details provided by the user when the user registered with the institution operating the cheque cashing ATM 10 (step 218). In this example, the user registered a two hundred dollars cheque that was received weekly, and the cheque being presented is made out for two hundred dollars. If the amounts do not match, then the controller 86 initiates a cheque return operation, described hereinbelow. If the amounts do match, as in this example, then the display 36 displays the charge that will be deducted for cashing the cheque (step 220), in this example five dollars, and requests the user to confirm that he is willing to pay this charge to cash the cheque (step 222).

If the user accepts the charge, then the printer 76 prints endorsement data onto the cheque (step 224), and cash is dispensed through the cash dispense slot 50 to the user (step 226). The cash is to the value of the courtesy amount of the cheque minus the charge levied for cashing the cheque, in this example, one hundred and ninety five dollars. The cheque is then transported to the imager 74 to image the endorsed cheque (step 227) before it is transported through the diverter apparatus 100 to the storage bin 78 (step 228) for subsequent collection and further processing. If the user does not wish to pay the charge, then the controller 86 initiates a cheque return operation.

When a cheque return operation is initiated, the transport mechanism 70 reverses the direction of transport (step 240) to convey the cheque through the diverter apparatus 100 to the cheque input/output slot 56 to return the cheque to the user via the cheque input/output slot. The controller 86 may monitor the slot 56 to ensure that the cheque has been removed by the user (step 242). If the user has not removed the cheque within a predetermined time period, the cheque is retracted and conveyed to a reject bin (not shown) (step 244).

Although the above-description describes a cheque being cashed in its entire amount by an ATM customer, it is contemplated that the cheque may be cashed only in partial amount of the entire amount of the cheque at the ATM 10, with the remaining amount of the cheque being deposited to a banking account. It is also conceivable that the entire amount of the cheque be deposited by an ATM customer into a banking account.

It should be apparent that the diverter apparatus 100 is relatively compact and, therefore occupies relatively less space within an ATM. It should also be apparent that the diverter apparatus 100 is a belt-driven type of diverter mechanism which provides a diverting function and which provides active drive for a document, such as a cheque, as the document is transported around a relatively tight corner, such as the substantially 90-degrees angles as described hereinabove. By providing active drive for a document as the document is transported around a relatively tight corner, a relatively lower document jam rate should result.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A self-service terminal for use in an unattended environment to a allow a self-service user to conduct a self-service transaction, the self-service terminal comprising:

a fascia including means defining a document slot;

means defining a document storage bin; and a document processing module including means defining a document processing zone, means defining a first document transport path which extends between the document slot and the document processing zone, means defining a second document transport path which is different from the first document transport path and which extends between the document processing zone and the document storage bin, and a document diverter for (i) enabling a document to be transported along the first document transport path between the document slot and the document processing zone when parts of the document diverter mechanism are in a first position, and (ii) enabling a document to be transported along the second document transport path from the document processing zone to the document storage bin when parts of the document diverter mechanism are in a second position which is different from the first position;

the document diverter mechanism including first and second rollers and a movable diverter roller disposed between the first and second rollers such that (i) the diverter roller and the first roller co-operate to define at least a portion of the first document transport path extending between the document slot and the document processing zone when parts are in the first position, and (ii) the diverter roller and the second roller co-operate to define at least a portion of second document transport path extending between the document processing zone and the document storage bin when parts are in the second position, wherein the document diverter mechanism includes an endless belt drivingly interconnecting the diverter roller and the first and second rollers.

2. A self-service terminal according to claim 1, wherein the document diverter mechanism includes an energizeable solenoid for, when energized, moves parts from one position to the other position.

3. A self-service terminal according to claim 2, wherein the document diverter mechanism includes resilient means for returning parts from the other position back to the one position when the solenoid is de-energized.

4. A self-service terminal according to claim 3, wherein the other position corresponds to the first position and the solenoid being energized, and the one position corresponds to the second position and the solenoid being de-energized.

5. A cheque cashing automated teller machine (ATM) for enabling an ATM customer to conduct a cheque deposit transaction, the cheque cashing ATM comprising:

an ATM fascia including (i) means defining a currency dispensing slot through which currency can be dispensed to an ATM customer, and (ii) means defining a cheque entrance/exit slot;

a currency dispensing module for dispensing currency via the currency dispensing slot to an ATM customer;

a cheque storage bin for storing cheques deposited by ATM customers; and a cheque processing module for receiving a cheque from an ATM customer, the cheque processing module including means defining a cheque processing zone, means defining a bi-directional cheque transport path which extends between the cheque entrance/exit slot and the cheque processing zone, means defining a divert cheque transport path which is different from the bi-directional cheque transport path and which extends between the cheque processing zone and the cheque storage bin, and a cheque path diverter mechanism for (i) enabling a cheque to be transported along the bi-directional cheque transport path between the cheque entrance/exit slot and the cheque processing zone when parts of the cheque path diverter mechanism are in a first position, and (ii) enabling a cheque to be transported along the divert cheque transport path from the cheque processing zone to the cheque storage bin when parts of the cheque path diverter mechanism are in a second position which is different from the first position;

the cheque path diverter mechanism including first and second roller members and a movable diverter roller member disposed between the first and second roller members such that (i) the diverter roller member and the first roller member co-operate to define at least a portion of the bi-directional cheque transport path extending between the cheque entrance/exit slot and the cheque processing zone when parts are in the first position, and (ii) the diverter roller member and the second roller member co-operate to define at least a portion of the divert cheque transport path extending between the cheque processing zone and the cheque storage bin when parts are in the second position; and a controller for controlling the currency dispensing module to dispense currency via the currency dispensing slot to an ATM customer when a cheque which has been deposited by the ATM customer is transported along the divert cheque transport path from the cheque processing zone to the cheque storage bin, wherein the cheque path diverter mechanism includes an endless belt drivingly interconnecting the diverter roller member and the first and second roller members.

6. A cheque cashing ATM according to claim 5, wherein the cheque path diverter mechanism includes an energizeable solenoid for, when energized, moves parts from one position to the other position.

7. A cheque cashing ATM according to claim 6 wherein the cheque path diverter mechanism includes resilient means for returning parts from the other position to the one position when the solenoid is de-energized.

8. A cheque cashing ATM according to claim 7, wherein the other position corresponds to the first position and the solenoid being energized, and the one position corresponds to the second position and the solenoid being de-energized.

9. A cheque cashing ATM according to claim 8, wherein the cheque processing module includes a magnetic ink character recognition (MICR) reader disposed along the bi-directional cheque transport path.

10. A document diverter apparatus for use in a self-service terminal at which a self-service user can deposit a document to conduct a self-service transaction, the document diverter apparatus comprising:

first and second roller members;

a movable diverter roller member disposed between the first and second roller members and movable between the first and second roller members such that the diverter roller member and the first roller member co-operate to define at least a portion of a first document transport path of the self-service terminal when the diverter roller member and the first roller member are moved to a first position and the diverter member and the second roller member co-operate to define at least a portion of a second document transport path of the self-service terminal when the diverter roller member and the second roller member are in a second position which is different from the first position; and an endless belt drivingly interconnecting the diverter roller member and the first and second roller members.

11. A document diverter apparatus according to claim 10, further comprising an energizeable solenoid for, when energized, moves parts from one position to the other position.

12. A document diverter apparatus according to claim 11, wherein the other position corresponds to the first position and the solenoid being energized, and the one position corresponds to the second position and the solenoid being de-energized.

* * * * *